United States Patent Office 2,710,887
Patented June 14, 1955

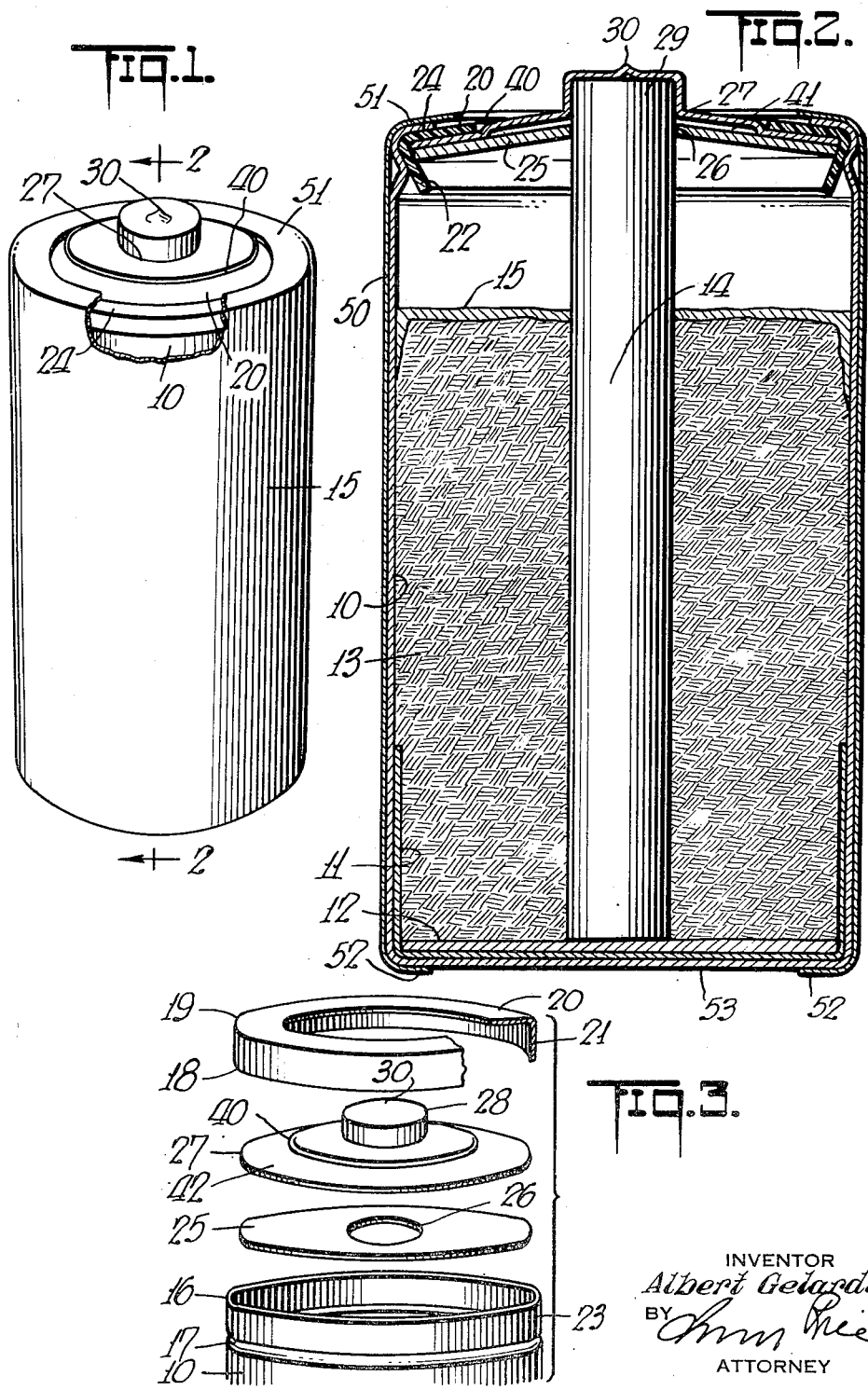

2,710,887

METHOD OF SEALING DRY CELLS AND SEALED DRY CELL CONSTRUCTION

Albert Gelardin, New York, N. Y.

Application February 8, 1954, Serial No. 408,640

6 Claims. (Cl. 136—133)

The present invention relates to a sealed battery construction, and it particularly relates to a small-size dry cell battery of the type used for flashlights.

It is among the objects of the present invention to provide a simple sealed battery construction which may be readily manufactured by unskilled labor and which will be produced with assurance of long life.

Another object of the present invention is to make a battery construction which, with the use of relatively few parts, will be substantially automatically self-sealing incidental to manufacture and assembly thereof without special sealing operations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a metal or zinc can for the battery, which will have a beading or inwardly directed ridge around the upper periphery thereof, which will serve to cam inwardly or to cause folding of a plastic sealing ring which will be dropped into the top of the can after filling of the electrolyte mixture therein.

This ring is desirably of L-shaped cross-section with a top horizontal flange and a vertical downwardly directed flange, which will first rest upon the bead or ridge and will then be folded inwardly to form a seal around and on both sides of the top metal plate which holds the upper end of the central carbon in position.

Desirably, there is also assembled with the top metal plate a plastic or fiber disc which also will be enclosed and secured by the in-turned circular plastic sealing ring.

Then the entire battery may be enclosed by an insulating sleeve which will closely hug the periphery of the can and also be flanged over the top and bottom of the cylindrical battery or dry cell assembly.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

Fig. 1 is a top perspective view, partly broken away, of one form of cylindrical dry cell construction according to the present invention.

Fig. 2 is a transverse vertical longitudinal section view of the battery upon the line 2—2 of Fig. 1 and upon an enlarged scale as compared to Fig. 1.

Fig. 3 is an exploded or separated perspective view showing the elements assembled to form the top battery seal.

Referring to Fig. 2, there is shown a dry cell having the standard can of zinc 10, which has a bottom cup 11 carrying the fiber bottom disc 12.

This can is filled with a moist charge forming composition 13.

This composition surrounds the carbon electrode or pole 14.

The top of the moist mass 13 is sealed, as indicated at 15, by a plastic composition which may be poured into the can as the charge is placed therein.

The present invention is particularly directed to the sealing procedure and to the resultant seal which is formed.

It will be noted that the can initially, at its upper periphery 16 in Fig. 3, has an inwardly directed bead or ridge 17 which will act as a camming element and also as a stop for the lower edge 18 of the plastic sealing ring 19. The plastic sealing ring or deformable sealing ring 19 has a horizontal flange 20 and a vertical flange 21. It is the vertical flange 21 which is deformed inwardly to the position indicated at 22 in Fig. 2 and which forms the seal when it is pressed in position and when the upper peripheral edge 23 of the can 10 is deformed into the sealing position as indicated at 24 in Fig. 2.

Inside of the ring 19 will be the sealing fibrous or plastic disc or annulus 25 having a central opening 26 for the carbon pole 14.

There will also be the metal top plate 27 having the central dome 28 to receive the top 29 of the carbon pole 14.

This plate 27 will also have a top mount or projection 30 which forms the point of contact or connection to the carbon pole 14 and it has the peripheral shoulder 40 which will form the space 41 in the assembled construction of Fig. 2 and which will also form a recess 42 for the horizontal flange 20 of the sealing ring 19.

In assembly, the elements 27 and 25 are placed inside of the ring element 19 and this sub-assembly is then dropped into the upper end of the can 15 and onto the upper end 29 of the pole 14. Then the peripheral portion 23 of the can 10 is folded into the position 24 of Fig. 2. This will press the flange 21 inwardly to the position of Fig. 2, as indicated at 22, and will seal the peripheral edges of the disc 27 and the plate 25, as well as the top of the battery can 10.

As a final operation, the insulating sleeve 50 may be placed around the cylindrical can 10 and the upper and lower edges may be folded over, as indicated at 51 and 52, to form the completed assembly.

The contact may be had at the lower exposed can portion 53 as well as at the upper dimple portion 30.

The construction thus described will produce an effective seal and will give an exceptionally durable, moisture proof gasket effect. The sealing ring 19 may be of any flexible, non-conducting, soft, plastic material such as polyethylene.

The shoulder 40 on the disc 27 will not only locate the flange 20 of the sealing ring 19, but it will also act as a stiffener.

The insulating discs 12 and 25 may be made of asphalt impregnated paper or of vulcanized fiber.

The moist compositions 13 will be held in position and prevented from drying out, even though the dry cells be stored for long periods of time or kept without usage in flashlight structures.

The seal of the present application will substantially be automatic when the can portion 23 is rolled over without special machinery or special workmanship, and it will be particularly effective in moist or hot climates or in tropical or semi-tropical climates.

The sealing ring 20 may be moulded without any particular undercuts and in the final assembly of Fig. 2 it forms just as effective a seal as would a channel cross-section sealing ring.

The channel effect, as indicated in Fig. 2, results automatically upon completion of the assembly when the top of the can 10 is folded inwardly, as indicated at 24 in Figs. 1 and 2. Thus a relatively simple cross-section, as indicated at 19 in Fig. 3, can be utilized to achieve the desired sealing effect.

As many changes could be made in the above sealed dry cell construction, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A method of sealing dry cell batteries which comprises providing a can with an upper, peripheral, inwardly directed sealing ridge and dropping a sealing ring thereinto together with an insulating disc and a metal top plate and rolling over the upper edge of the can to cause said sealing ring to be folded inwardly by said ridge to enclose and seal the periphery of the disc and top.

2. A method of sealing dry cell batteries which comprises providing a can with an upper, peripheral, inwardly directed sealing ridge and dropping a sealing ring thereinto together with an insulating disc and a metal top plate and rolling over the upper edge of the can to cause said sealing ring to be folded inwardly by said ridge to enclose and seal the periphery of the disc and top, said sealing ring being of L-shaped cross-section with a top horizontal flange and a lower vertical flange which is engaged by and stopped by said ridge.

3. A method of sealing dry cell batteries which comprises providing a can with an upper, peripheral, inwardly directed sealing ridge and dropping a sealing ring thereinto together with an insulating disc and a metal top plate and rolling over the upper edge of the can to cause said sealing ring to be folded inwardly by said ridge to enclose and seal the periphery of the disc and top, and then enclosing the battery can with an insulating cover which will have flanges extending over the top and bottom of the can.

4. A method of sealing dry cells which comprises dropping an assembly of a sealing ring and top metal plate into the upper portion of the can after the can has been filled with moist composition and then compressing the sealing ring so that the ring seals the peripheral edges of the top metal plate.

5. A sealed dry cell construction comprising a metal can having an inwardly rolled over top edge and also having a top peripheral inwardly directed camming bead, and an assembly of a sealing ring and metal cap positioned on said bead, said ring being turned inwardly by said bead to seal the periphery of said metal cap.

6. A sealed dry cell construction comprising a metal can having an inwardly rolled over top edge and also having a top peripheral inwardly directed camming bead, and an assembly of a sealing ring and metal cap positioned on said bead, said ring being turned inwardly by said bead to seal the periphery of said metal cap, said sealing ring being an L-shaped cross-section, the sealing ring and metal cap being tightly peripherally clamped between the bead and the rolled over top edge of the metal can.

References Cited in the file of this patent

UNITED STATES PATENTS

| 2,025,028 | Fleckenstein et al. | Dec. 24, 1935 |
| 2,289,249 | Deibel | July 7, 1942 |
| 2,307,763 | Deibel | Jan. 12, 1943 |
| 2,546,379 | Woodring et al. | Mar. 27, 1951 |
| 2,569,159 | Gelardin | Sept. 25, 1951 |
| 2,595,963 | Lewis et al. | May 6, 1952 |
| 2,636,063 | Schroeder | Apr. 21, 1953 |

FOREIGN PATENTS

| 495,973 | Canada | Sept. 8, 1953 |
| 869,980 | Germany | Mar. 9, 1953 |